United States Patent
Shimamura et al.

(10) Patent No.: US 6,681,299 B1
(45) Date of Patent: Jan. 20, 2004

(54) CACHE-TAG CONTROL METHOD IN INFORMATION PROCESSING APPARATUS HAVING CACHE, WITH ERROR CHECKING MECHANISM IN CACHE TAG, AND INFORMATION PROCESSING APPARATUS USING THIS CONTROL METHOD

(75) Inventors: Takayuki Shimamura, Kawasaki (JP); Shinya Kato, Kawasaki (JP); Takato Noda, Kawasaki (JP); Takumi Nonaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/537,353

(22) Filed: Mar. 29, 2000

(30) Foreign Application Priority Data

Sep. 2, 1999 (JP) .......................................... 11-248408

(51) Int. Cl.⁷ ................................................ G06F 9/06
(52) U.S. Cl. ..................... 711/145; 711/144; 711/120; 714/21; 714/54
(58) Field of Search .................... 711/118, 144, 711/145, 120, 122; 714/6, 21, 774, 53, 54

(56) References Cited

U.S. PATENT DOCUMENTS

| | | | | | |
|---|---|---|---|---|---|
| 5,509,119 | A | * | 4/1996 | La Fetra | 714/52 |
| 5,835,951 | A | * | 11/1998 | McMahan | 711/145 |
| 5,875,464 | A | * | 2/1999 | Kirk | 711/129 |
| 5,916,314 | A | * | 6/1999 | Berg et al. | 714/6 |
| 5,970,509 | A | * | 10/1999 | Green | 711/128 |
| 6,134,633 | A | * | 10/2000 | Jacobs | 711/137 |
| 6,226,763 | B1 | * | 5/2001 | Fu et al. | 711/118 |
| 6,292,906 | B1 | * | 9/2001 | Fu et al. | 711/146 |

* cited by examiner

Primary Examiner—Pierre-Michel Bataille
(74) Attorney, Agent, or Firm—Staas & Halsey LLP

(57) ABSTRACT

To provide a cache-tag control method capable of correcting an error and capable of keeping a high-speed operation of a system at the same time. A true-tag with a parity code attached and a shadow-tag having an inverted polarity of the true-tag are stored respectively in separate addresses within a cache tag-RAM. At the time of retrieving the tags, both the true-tag and the shadow-tag are checked respectively to see whether there is an error in each tag. When an error has been detected, a hit decision is made by using a tag in which there is no error. Further, data within the cache tag-RAM is updated by using the tag in which there is no error, thereby correcting the error.

16 Claims, 8 Drawing Sheets

CACHE-TAG CONTROL METHOD IN INFORMATION PROCESSING APPARATUS HAVING CACHE, WITH ERROR CHECKING MECHANISM IN CACHE TAG, AND INFORMATION PROCESSING APPARATUS USING THIS CONTROL METHOD

BACKGROUND OF THE INVENTION

1. Field of the Invention

The present invention relates to an information processing apparatus having a cache, and to a cache-tag control method in an information processing apparatus.

2. Description of Related Art

In recent years, there has been an increasing demand for improvement in the reliability of computer systems. Further, along with this demand, there has also been a demand for improvement in the reliability of cache tags. A conventional method of controlling cache tags has employed a checking mechanism such as a parity check or the like. However, there has been no mechanism for correcting error tags.

Accordingly, there has been a dilemma in that while it is desired to provide cache tags with an error detecting and correcting function like ECC (error checking and correction), the execution of the ECC function in the cache tags fails to decrease a cycle time though a high-speed operation is required. This results in deterioration in system performance. Further, the addition of the ECC function to tag data having a smaller data width than that of the cache data leads to an increase in hardware volume of additional circuits such as a syndrome code generator circuit and error detecting and correcting circuits. Although this addition increases the system reliability, this has a problem of cost increase. Further, in order to improve the reliability of memories, there has been a conventional method of duplexing data and holding one data in an inverted format as a measure for compensating for an error in other one bit data. However, there has been no means for applying this method to the tag data.

SUMMARY OF THE INVENTION

In an information processing apparatus having a cache, with an error checking function held in a cache tag, it is an object of the present invention to provide a cache-tag control method capable of correcting an error in tag data by using a duplexed shadow-tag based on an error detecting method with a smaller volume of circuits, and capable of keeping the high-speed operation of the system at the same time.

Further, it is another object of the invention to provide an information processing apparatus for realizing the above-described cache-tag control method.

The present invention has been made to achieve the above objects.

The present invention is applied to an information processing apparatus having a cache, and having an error checking function in a cache tag. A true-tag which is data of a cache tag with an error check bit and a shadow-tag which is data having an inverted polarity of the true-tag are stored in separate addresses within one and the same tag-RAM. At the time of retrieving tags, the true-tag and the shadow-tag are retrieved one by one to carry out an error check. When there is no error in the true-tag, a hit decision is made by using this true-tag. When there is an error in the true-tag and there is no error in the shadow-tag, a hit decision is carried out by using the shadow-tag.

In the present invention, it is also possible to store the true-tag and the shadow-tag in identical addresses within separate tag-RAMs. In this case, at the time of retrieving tags, the true-tag and the shadow-tag are retrieved at the same time to carry out an error check. As a result of the error checking, a hit decision is made by using a tag in which there is no error.

According to both methods described above, in an information processing apparatus having a cache, with an error checking function held in a cache tag, it is possible to obtain a cache-tag control method capable of correcting an error in tag data by using a duplexed shadow-tag based on an error detecting method with a smaller volume of circuits, and capable of keeping high-speed operation of the system at the same time.

BRIEF DESCRIPTION OF THE DRAWINGS

The above objects and features of the present invention will be more apparent from the following description of the preferred embodiments with reference to the accompanying drawings, wherein.

DESCRIPTION OF THE PREFERRED EMBODIMENTS

Figure 1:
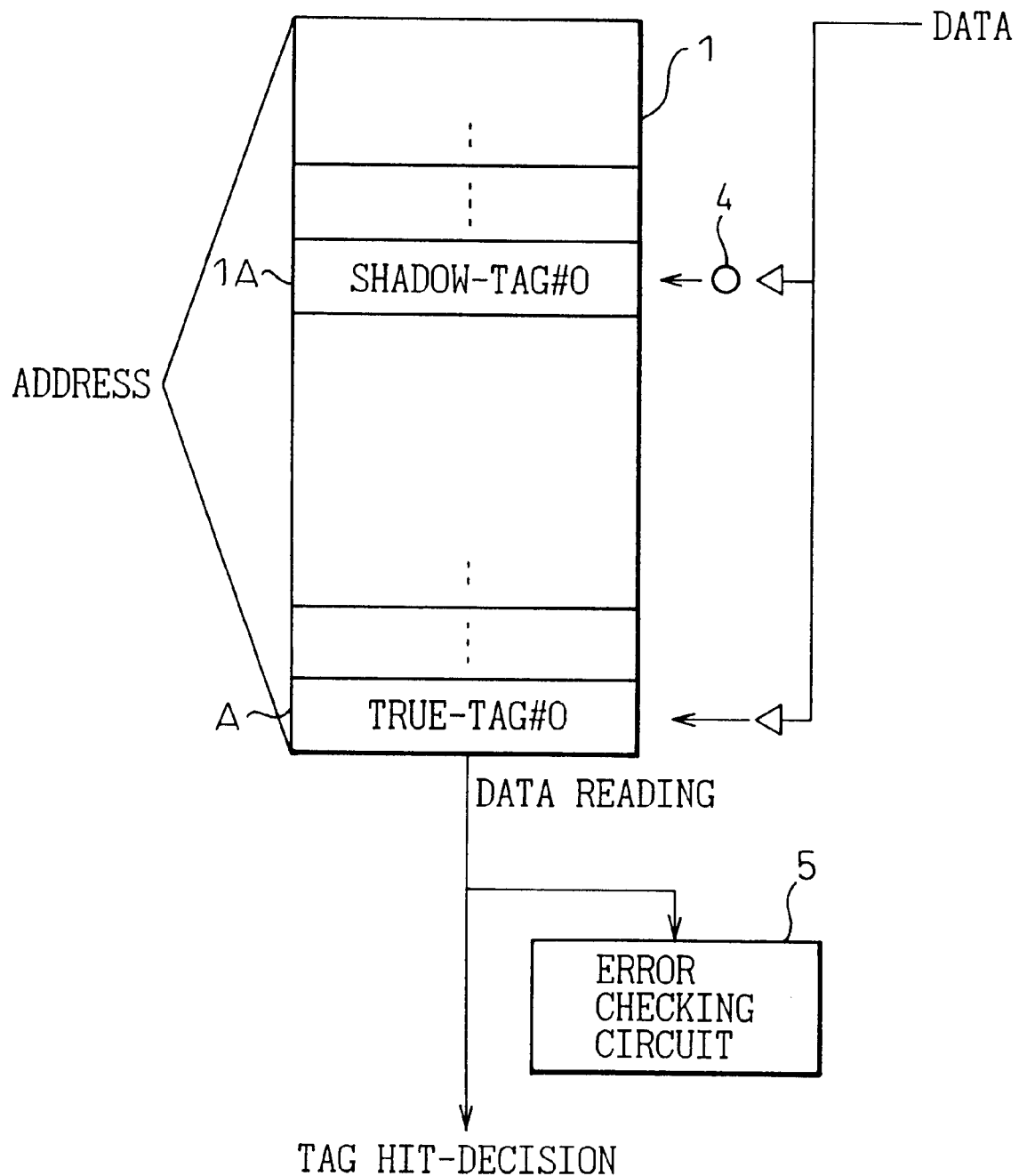
FIG. 1 is diagram for illustrating a structure of a cache tag-RAM in an information processing apparatus according to the present invention.
Figure 2:
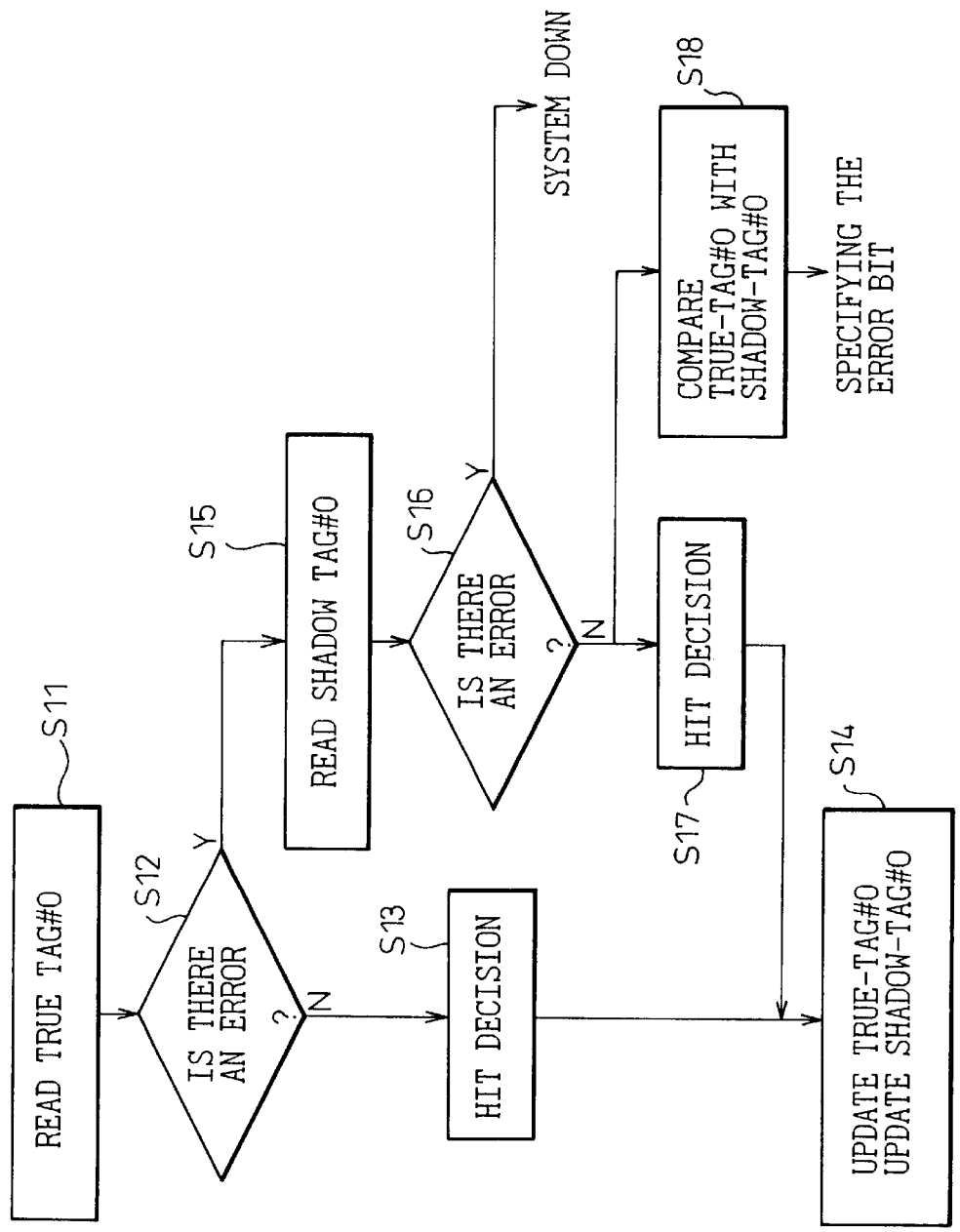
FIG. 2 is a flowchart for showing operation of the information processing apparatus shown in FIG. 1.

The principle of a method of controlling a cache tag according to the present invention will be explained below with reference to FIG. 1 and FIG. 2. FIG. 1 shows a cache tag-RAM in an information processing apparatus according to the present invention, and FIG. 2 shows a flow of the cache-tag control method.

As shown in FIG. 1, one cache TAG-RAM1 (RAM:Random Access Memory) stores TRUE-TAG (#0-) and SHADOW-TAG (#0-) in two different addresses A and 1A respectively. TRUE-TAG (#0-) is data of a cache tag attached with an error-checking code like a parity-check code, and SHADOW-TAG (#0-) is data having its polarity inverted by an inverter 4. An error checking circuit 5 like a parity checking circuit makes a decision as to whether there is an error or not in the data read from the cache TAG- RAM1. The error checking circuit 5 makes a hit decision based on data having no error.

The operation of FIG. 1 will be explained below with reference to FIG. 2. At the time of retrieving tags, TRUE-TAG and SHADOW-TAG are retrieved (that is, the data are read one by one). At first, TRUE-TAG#0 is retrieved (step S11), and the error checking circuit 5 carries out an error checking (step S12). When there is no error in TRUE-TAG#0 as a result of this checking, the error checking circuit 5 makes a hit decision by using TRUE-TAG#0 (step S13). Thereafter, TRUE-TAG#0 is directly input to the cache TAG-RAM 1 via the inverter 4, and the stored TRUE-TAG#0 and SHADOW-TAG#0 are updated (step S14).

On the other hand, in the step S12, when TRUE-TAG#0 is in error, SHADOW-TAG#0 is retrieved (step S15), and the error checking circuit 5 carries out error checking (step S16). In this case, when there is no error in SHADOW-TAG#0 as a result of this checking, the error checking circuit 5 makes a hit decision by using the data of SHADOW-TAG#0 (step S17). Thereafter, TRUE-TAG#0 and SHADOW-TAG#0 are updated by using the SHADOW-TAG#0 that has no error (step S14).

Further, when a decision has been made in step S16 that there is no error in SHADOW-TAG, the updating of the TRUE-TAG in the address where an error has been detected and the updating of SHADOW-TAG are restrained. Then, the TRUE-TAG#0 in which an error has been detected and the SHADOW-TAG#0 in which no error has been detected are compared with each other including check bits, thereby specifying an error bit (step S18).

In this case, when the tags including error-detecting bits can be referred to by software, it becomes possible to specify an error bit by comparing both tags. Further, it may be so arranged that, with a provision of a register for holding TRUE-TAG, the TRUE-TAG is compared with the SHADOW-TAG by hardware to specify a bit having a difference, and this bit is recorded in the register from which the bit can be read by software. With this arrangement, it becomes possible to specify an error bit.

Next, when a decision has been made in the step S16 that there is an error in SHADOW-TAG, a system halt occurs as errors have been detected in both TRUE-TAG#0 and SHADOW-TAG#0.

Figure 3:
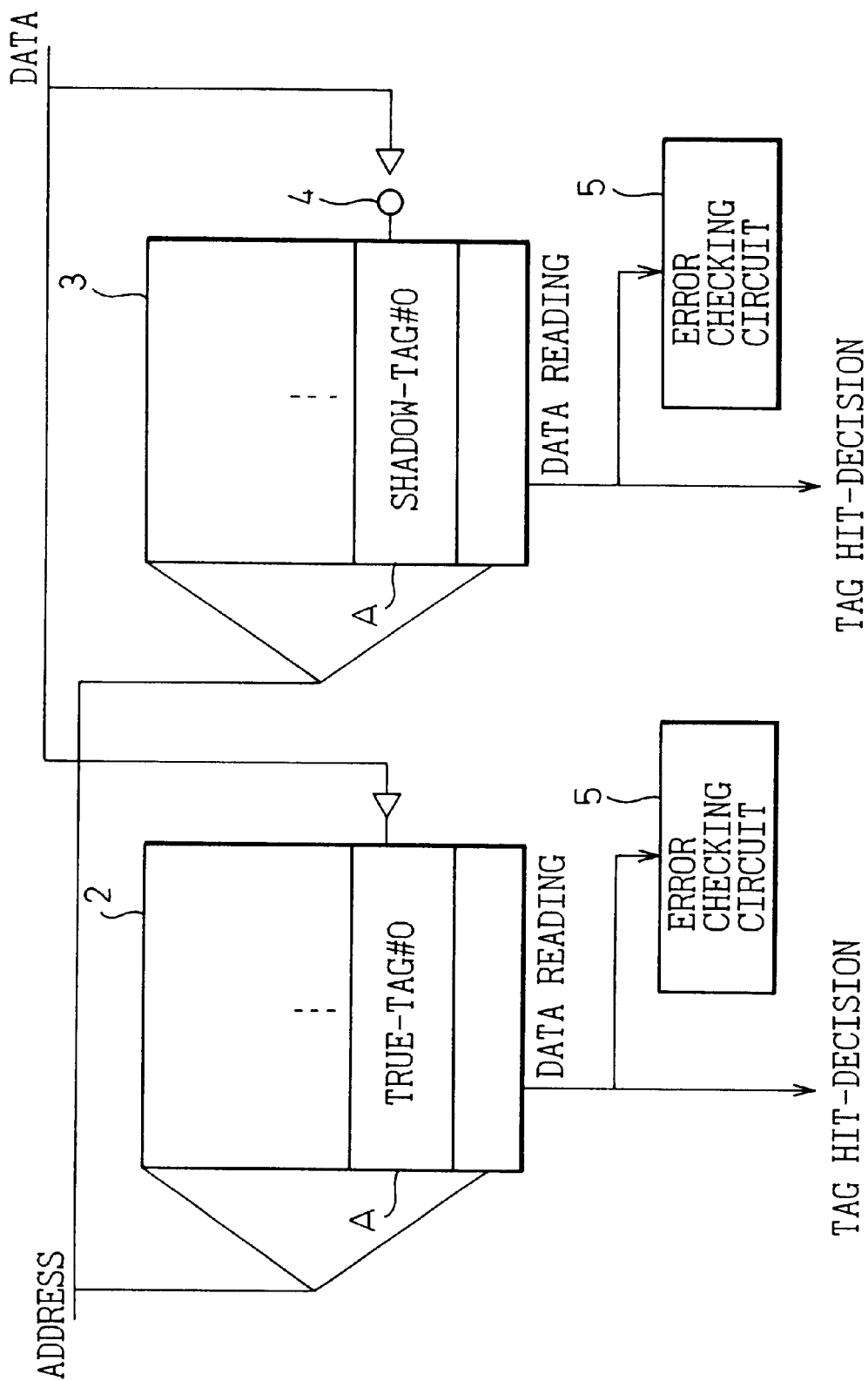
FIG. 3 is a diagram for illustrating another example of the cache tag-RAM shown in FIG. 1.

FIG. 3 shows another example of the cache tag-RAM shown in FIG. 1.

In the example shown in FIG. 3, two cache TAG-RAMs 2 and 3 store TRUE-TAG and SHADOW-TAG in identical addresses A and A respectively. At the time of retrieving tags, both TRUE-TAG and SHADOW-TAG are retrieved simultaneously. Then, an error checking circuit 5 carries out an error checking. The error checking circuit 5 makes a hit decision by using data in which there is no error. Other points of operation are similar to those of the examples shown in FIG. 1 and FIG. 2.

Figure 4:
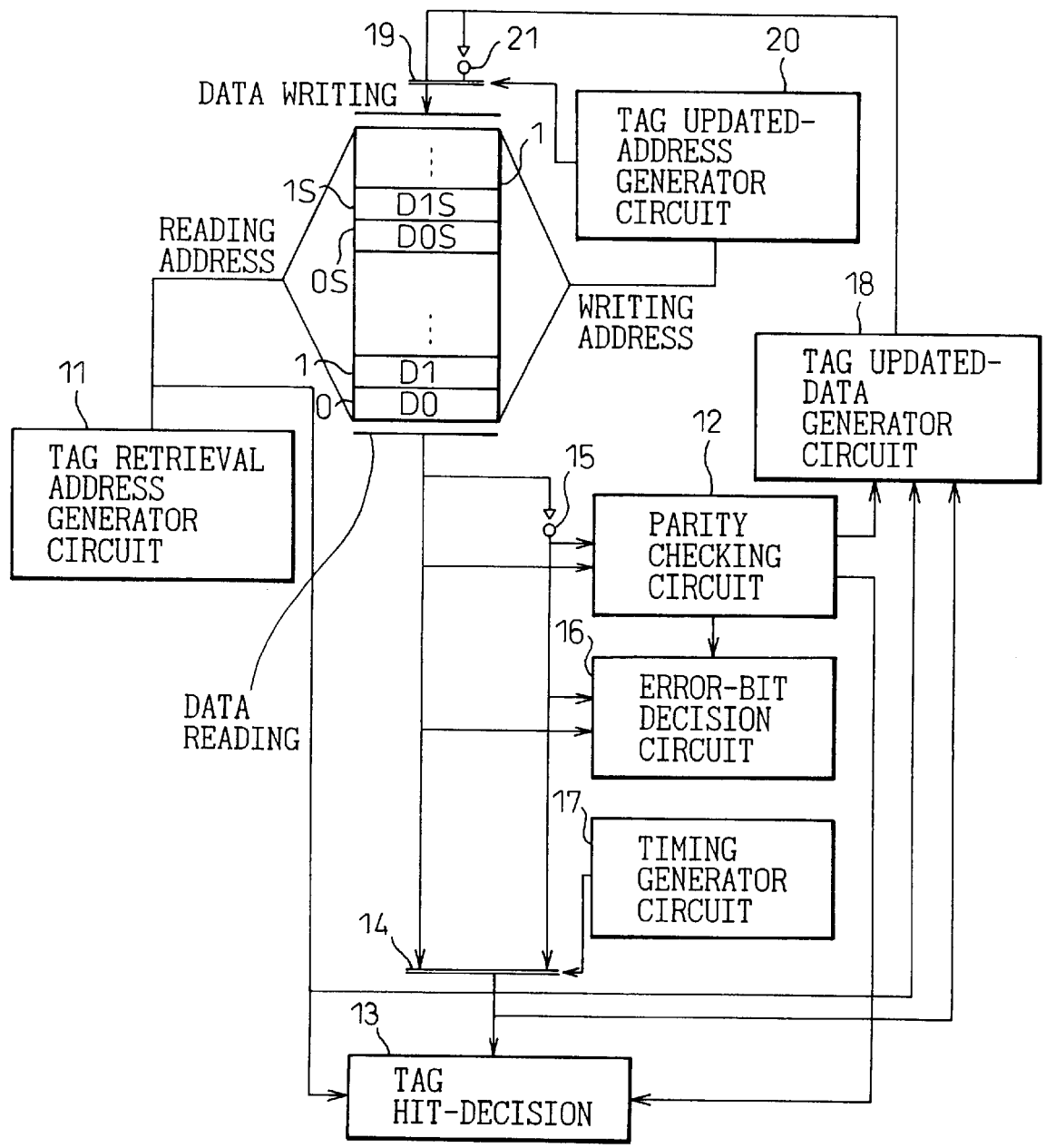
FIG. 4 is a diagram for schematically illustrating a detailed structure of circuits for realizing a cache-tag control method according to the present invention.

FIG. 4 shows a detailed structure of circuits for realizing a cache-tag control method. FIGS. 5 to 8 show timing charts for explaining the tag control method based on the circuits shown in FIG. 4.

At first, the circuit structure shown in FIG. 4 will be explained. In the circuits shown in FIG. 4, the one cache TAG-RAM1 shown in FIG. 1 is used as a cache tag-RAM. It is also easy to substitute the above-described two TAG-RAMs 2 and 3 shown in FIG. 3 for this tag-RAM. TRUE-TAGs (D0, D1, . . . ) are stored in addresses 0, 1, . . . of the cache TAG-RAM1. SHADOW-TAGs (D0S, S1S, . . . ) which are the data of inverted polarity to the data of the TRUE-TAGs are stored in addresses 0S, 1S, . . . of the cache TAG-RAM1.

At the time of retrieving tags, a tag retrieval address generator circuit 11 generates an address of TRUE-TAG and an address of SHADOW-TAG. Then, the TRUE-TAG and SHADOW-TAG are read one by one. A parity checking circuit 12 carries out a parity check of the read TRUE-TAG and SHADOW-TAG. In the present example, a parity check for detecting a one-bit error using a small volume of circuits is used for detecting a data error. In this case, the polarity of the SHADOW-TAG is inverted by an inverter 15 to return it to the polarity same as that of the TRUE-TAG. A result of a checking by the parity checking circuit 12 is input to a tag hit-decision circuit 13, an error-bit decision circuit 16, and a tag updated-data generator circuit 18 respectively.

When the parity checking circuit 12 has detected a parity error in TRUE-TAG or SHADOW-TAG, the error-bit decision circuit 16 compares the TRUE-TAG with the SHADOW-TAG, and specifies a bit in which an error has occurred. This decision can also be made by using software of comparing TRUE-TAG with SHADOW-TAG including parity bits. In this method, an unmatched bit in the tag where the error has occurred can be specified as an error bit. Alternatively, with a provision of a register for holding TRUE-TAG, the TRUE-TAG may be compared with the SHADOW-TAG by hardware.

The TRUE-TAG and SHADOW-TAG read from the cache TAG-RAM are further input to a multiplexer 14. A timing generator circuit 17 generates a multiplexer selection signal, and switches the multiplexer 14 based on a hit decision timing of the TRUE-TAG and a hit decision timing of the SHADOW-TAG.

TRUE-TAG or SHADOW-TAG that has been selected by the multiplexer 14 is input to the tag hit-decision circuit 13. The tag hit-decision circuit 13 makes a hit decision based on either the TRUE-TAG or SHADOW-TAG input one by one, a tag retrieval address from the tag retrieval. address generating circuit 11, and a result of checking by the parity checking circuit 12. The TRUE-TAG or SHADOW-TAG selected by the multiplexer 14 is further input to the tag updated-data generator circuit 18. The tag updated-data generator circuit 18 generates updated data based on the TRUE-TAG or SHADOW-TAG, the tag retrieval address from the tag retrieval address generating circuit 11, and the result of checking by the parity checking circuit 12. The tag updated-data generator circuit 18 then outputs the updated data to a multiplexer 19. The updated data obtained becomes either the TRUE-TAG or SHADOW-TAG having the same polarity as that of the TRUE-TAG.

A tag updated-address generator circuit 20 generates a write address of the cache TAG-RAM1 and controls the multiplexer 19. When an address of the TRUE-TAG has been selected, the multiplexer 19 directly selects the updated data. When an address of the SHADOW-TAG has been selected, the multiplexer 19 selects the updated data of which polarity has been decided by an inverter 21. With this arrangement, in the cache TAG-RAM1, tag data is updated based on the data in which a decision has been made that there is no error as a result of an error checking of the data read out by the data retrieval.

Figure 5:
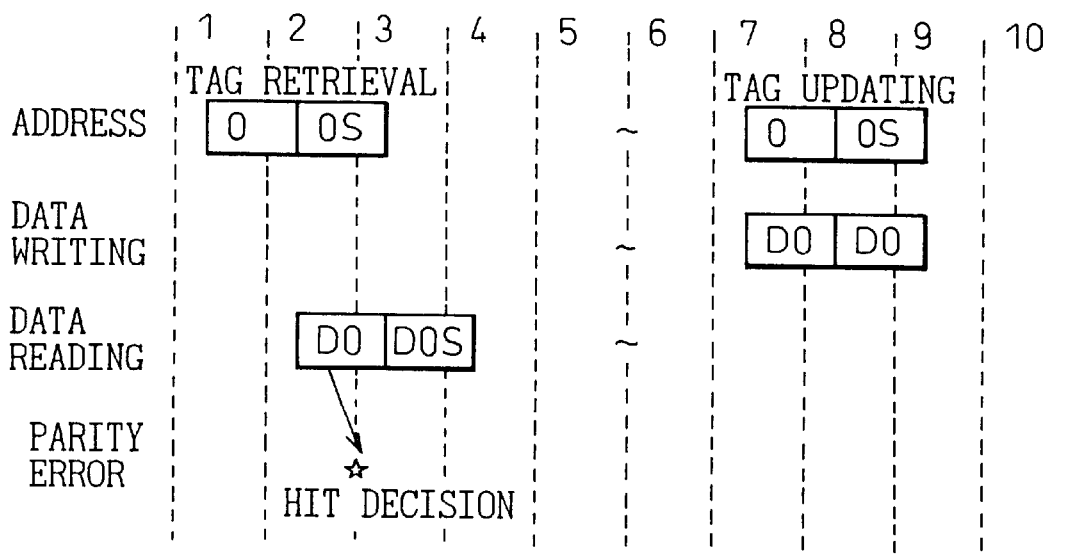
FIG. 5 is a timing chart for showing a first operation of the circuits shown in FIG. 4.

FIGS. 5 to 8 are timing charts showing the operation of the circuit structure shown in FIG. 4. FIG. 5 is a timing chart for showing a case where there is no parity error in either TRUE-TAG or SHADOW-TAG. At the time of retrieving tags, a tag retrieval address generator circuit 11 generates an address 0 of the TRUE-TAG at a timing 1, and generates an address 0S of the SHADOW-TAG at a timing 2. At the timing 2, data D0 of the TRUE-TAG is read from the TAG-RAM1. At a timing 3, data D0S of the SHADOW-TAG is read from the cache TAG-RAM1. Then, the polarity of this read data is inverted by the inverter 15. With this operation, the polarity of the SHADOW-TAG returns to the polarity the same as that of the TRUE-TAG. The parity checking circuit 12 then checks the parity of the TRUE-TAG and SHADOW-TAG respectively. In the present example, no error is detected.

The timing generator circuit 17 selects the TRUE-TAG at the timing 2, and switches the multiplexer 14 to select the SHADOW-TAG at the timing 3. The data selected by the multiplexer 14 is input to the tag hit-decision circuit 13. The tag hit-decision circuit 13 makes a hit decision by using the TRUE-TAG (D0) in which a decision has been made that there is no parity error at the timing 2.

At the time of retrieving tags, the tag updated-data generator circuit 18 outputs to the multiplexer 19 the non-error data of the TRUE-TAG (D0) as updated data. To the multiplexer 19, the updated data D0 and the updated data D0S of which polarity has been inverted by the inverter 21 are input.

At a timing 7, the tag updated-address generator circuit 20 generates an address 0 and switches the multiplexer 19 to data of which polarity the has not been inverted. At a timing 8, the tag updated-address generator circuit 20 generates an address 0S and switches the multiplexer 19 to data of which polarity has been inverted. Based on the above operation, the updated data of D0 is written into the address 0 at the timing 7, and the updated data of D0 with an inverted polarity is written into the address 0S at the timing 8. Accordingly, the data read at the time of retrieving tags are updated by the data having no error.

Figure 6:
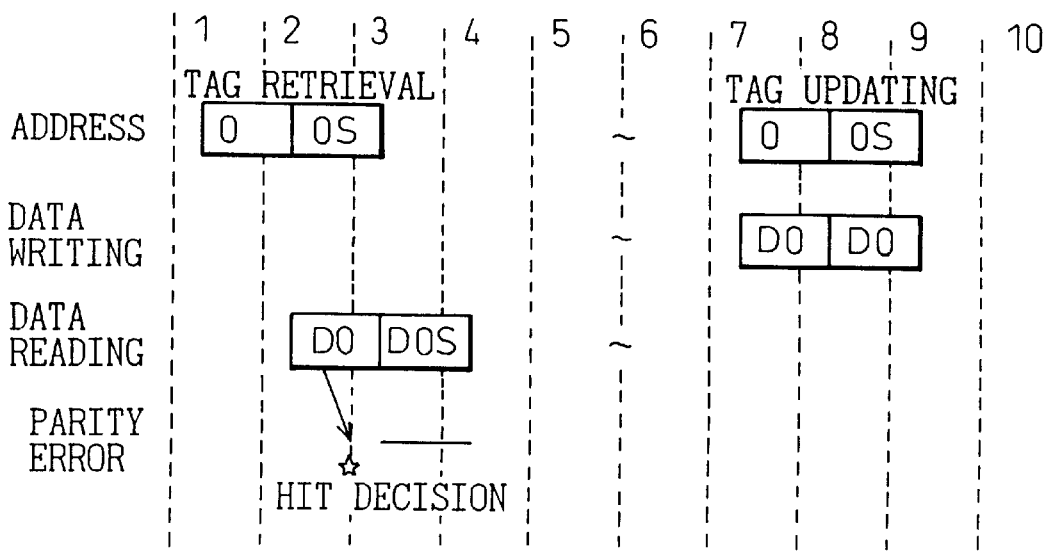
FIG. 6 is a timing chart for showing a second operation of the circuits shown in FIG. 4.

FIG. 6 is a timing chart for showing a case where there is no parity error in TRUE-TAG and there is a parity error in SHADOW-TAG. At timings 1 to 3, tags are retrieved in a similar manner to that of FIG. 5. As no parity is detected from the TRUE-TAG (D0), the tag hit-decision circuit 13 makes a hit decision by using the TRUE-TAG (D0). At the time of updating tags, the TRUE-TAG and SHADOW-TAG are updated by using only the data (D0) of the TRUE-TAG at timings 7 and 8, in a similar manner to that shown in FIG. 5. Accordingly, the parity error of the SHADOW-TAG (D0S) is corrected in this case.

Figure 7:
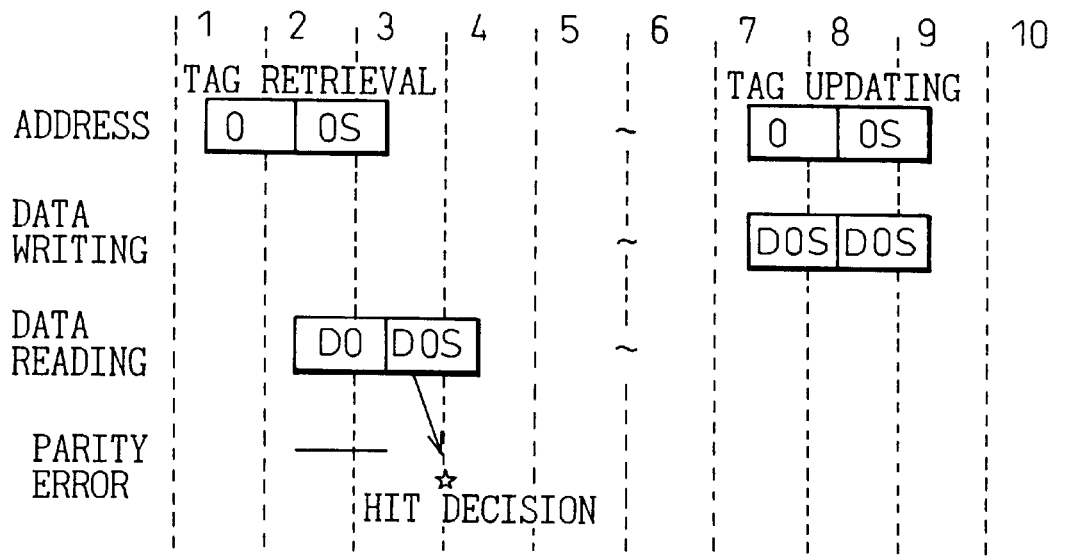
FIG. 7 is a timing chart for showing a third operation of the circuits shown in FIG. 4.

FIG. 7 is a timing chart for showing a case where there is a parity error in TRUE-TAG and there is no parity error in SHADOW-TAG. At timings 1 to 3, tags are retrieved in a similar manner to that of FIG. 5. At the timing 2, a parity error is detected from the TRUE-TAG (D0). As no parity error is detected from the SHADOW-TAG (D0S) at the timing 3, the tag hit-decision circuit 13 makes a hit decision by using the SHADOW-TAG. At the time of updating tags, the TRUE-TAG and SHADOW-TAG are updated by using only the data (D0S) of the SHADOW-TAG at timings 7 and 8. Accordingly, the parity error of the TRUE-TAG (D0) is corrected in this case.

Figure 8:
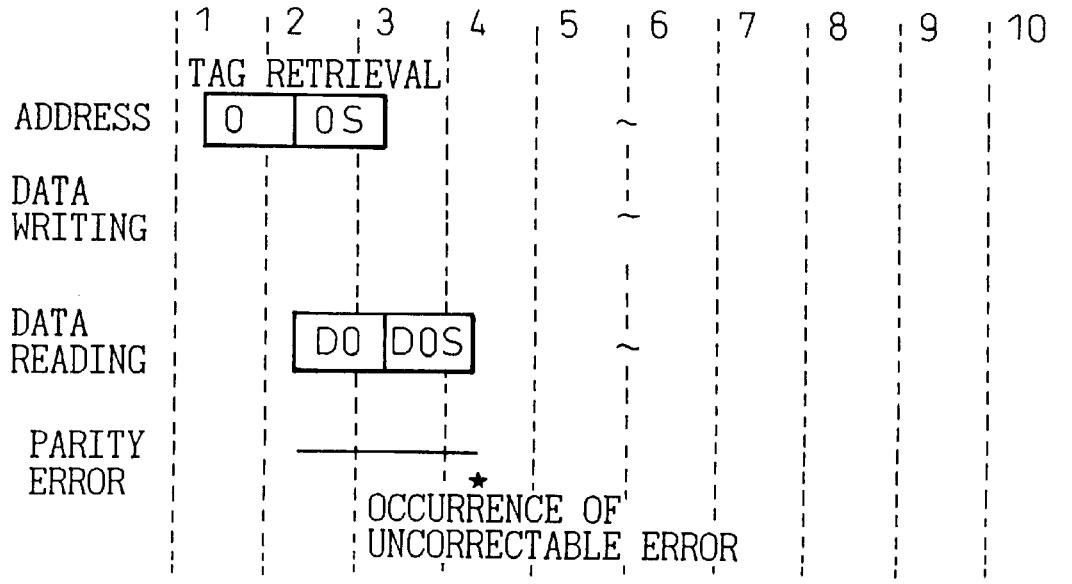
FIG. 8 is a timing chart for showing a fourth operation of the circuits shown in FIG. 4.

FIG. 8 is a timing chart for showing a case where parity errors have been detected in both TRUE-TAG and SHADOW-TAG. At timings 1 to 3, tags are retrieved in a similar manner to that of FIG. 5. At the timing 2, a parity error is detected from the TRUE-TAG (D0). Also, at the timing 3, a parity error is detected from the SHADOW-TAG (D0S). Accordingly, neither data can be used for the tag hit-decision circuit 13 to make a hit decision. As a result, an uncorrectable error occurs, which leads to a system halt. In this case, the tags are not updated.

Figure 9:
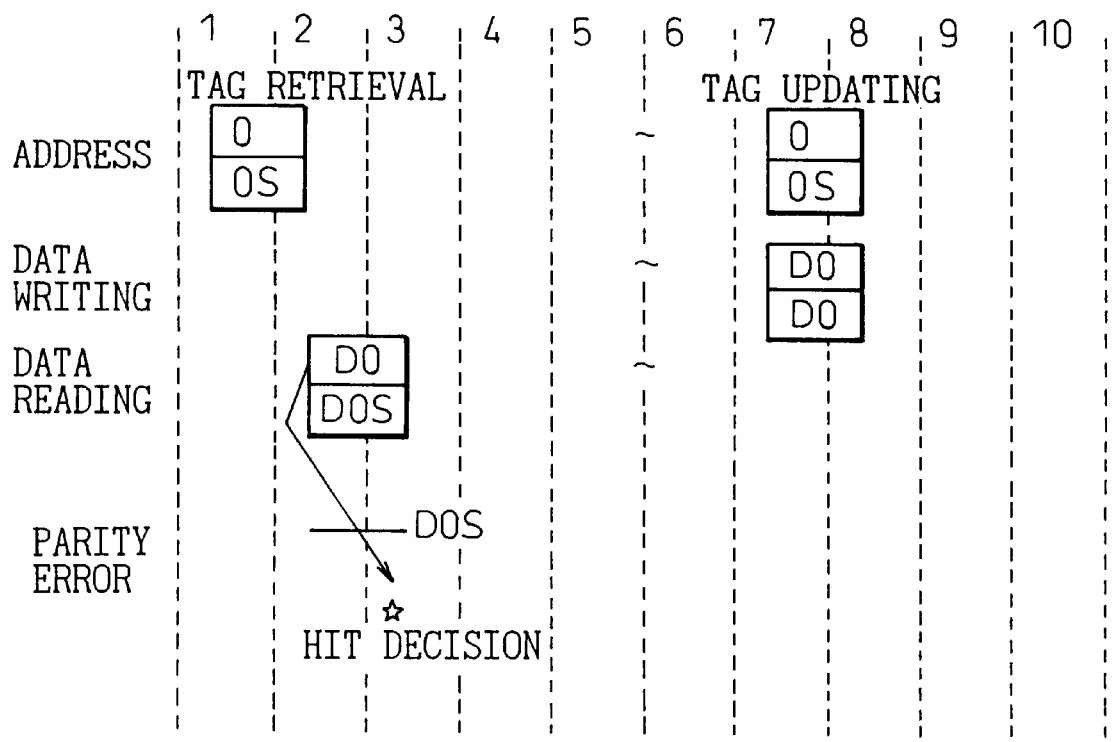
FIG. 9 is a timing chart for showing the operation of modified circuits of the circuits shown in FIG. 4.

It has been mentioned in the above explanation of the circuit structure shown in FIG. 4 that it is possible to use the two cache TAG-RAMs 2 and 3 shown in FIG. 3 in place of the one cache TAG-RAM1 shown in FIG. 1. The operation in this case will be explained below based on a timing chart of FIG. 9. FIG. 9 is a timing chart for showing a case where there is no parity error in TRUE-TAG and there is a parity error in SHADOW-TAG, which corresponds to the case described above with reference to FIG. 6.

At the time of retrieving tags, addresses 0 and 0S of TRUE-TAG and SHADOW-TAG, respectively, are generated simultaneously at a timing 1. At a timing of 2, TRUE-TAG(D0) and SHADOW-TAG(D0S) of corresponding addresses are read out simultaneously. In this case, the polarity of the SHADOW-TAG(D0S) is returned to the polarity the same as that of the TRUE-TAG by using an inverter. A parity check is carried out for the TRUE-TAG and SHADOW-TAG respectively at the same time by using two separate parity checking circuits 12. In the example of FIG. 9, a parity error is detected in the SHADOW-TAG (D0S). Therefore, the tag hit-decision circuit 13 makes a hit decision by using the TRUE-TAG(D0) that has no error. At the time of updating tags, addresses 0 and 0S are generated at a timing 7. At the same timing, data updated based on the data D0 is written into the addresses 0 and 0S respectively so that the tags are updated to TRUE-TAG and SHADOW-TAG having no error respectively.

Figure 10:
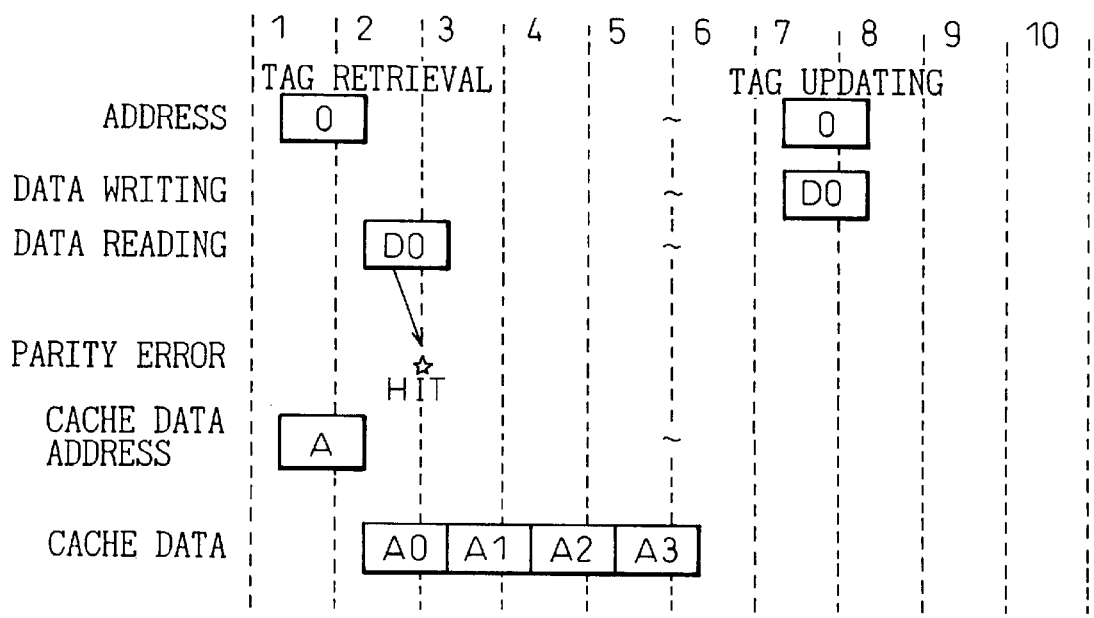
FIG. 10 is a timing chart for showing the operation of a prior-art example for comparison with the present invention.
Figure 11:
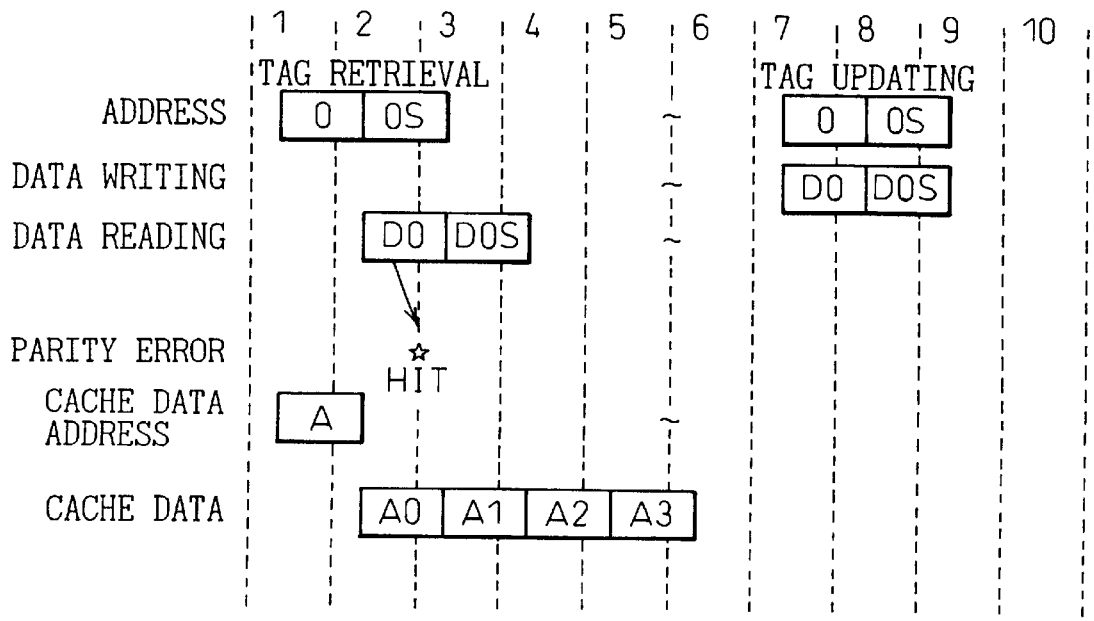
FIG. 11 is a timing chart for showing the operation of the present invention for comparison with the prior-art example.

A prior-art example will be compared with the, present invention based on timing charts shown in FIG. 10 and FIG. 11. According to a prior-art method shown in FIG. 10, basically, a tag is retrieved once. When this has been hit, data (A0, A1, A2, A3) for one line are taken out from the cache. Therefore, during a period of about four to eight cycles, the cache tag is not accessed. According to a method shown in FIG. 11, a duplexed tag (SHADOW-TAG) is retrieved at a timing 2, when a tag memory is not accessed at the timing 2 according to the prior-art method. Thus, the method of the present invention takes a measure to prepare for compensating for an error in case of an occurrence of a tag error. Accordingly, when there is no error, it is possible to operate the system at exactly the same timing as that of the prior-art technique. Furthermore, there is no loss in system operation time at all while the reliability of the system can be improved. As tags have been conventionally written one by one during the time when there is no cache access, the duplexing of tags brings about no deterioration in the performance of the system.

As explained above, according to the present invention, in an information processing apparatus having a cache, with an error checking function held in a cache tag, it is possible to obtain a cache-tag control method capable of correcting an error in tag data by using a duplexed shadow-tag based on an error detecting method with a smaller volume of circuits, and capable of maintaining high-speed operation of the system at the same time.

What is claimed is:

1. An information processing apparatus having a cache, with an error checking mechanism held in a cache tag, the apparatus comprising:
   a cache tag-RAM;
   a hit-decision circuit making a hit decision based on data read from the cache tag-RAM; and
   a memory circuit storing, in separate addresses in the cache tag-RAM, a true-tag that is data of a cache tag attached with an error check bit and a shadow-tag that is data having an inverted polarity of the true-tag, respectively.

2. An information processing apparatus according to claim 1, wherein the error checking mechanism retrieves the true-tag and the shadow-tag one by one at the time of retrieving the tags, and checks for an error; and the hit-decision circuit makes a hit decision by using the true-tag when the true-tag is not in error as a result of the error checking, and makes a hit decision by using the shadow-tag when the true-tag is in error and the shadow-tag is not in error as a result of the error checking.

3. An information processing apparatus according to claim 2, further comprising:

a tag-data updating circuit updating data of the tags by using either the true-tag or the shadow-tag in which there is no error, at the time of updating the tags.

4. An information processing apparatus having a cache, with an error checking mechanism held in a cache tag, the apparatus comprising:

two cache tag-RAMS;

a hit-decision circuit making a hit decision based on data read from the cache tag-RAMs; and a memory circuit storing in identical addresses within the two cache tag-RAMS, a true-tag that is data of a cache tag attached with an error check bit and a shadow-tag that is data having an inverted polarity of the true-tag, respectively.

5. An information processing apparatus according to claim 4, wherein the error checking mechanism retrieves the true-tag and the shadow-tag simultaneously at the time of retrieving the tags, and checks for an error; and the hit decision circuit makes a hit decision by using a tag of the true-tag or the shadow-tag in which there is no error.

6. An information processing apparatus according to claim 5, further comprising:

a tag-data updating circuit updating data of the tags by using either the true-tag or the shadow-tag in which there is no error, at the time of updating the tags.

7. A cache-tag control method in an information processing apparatus having a cache, with an error checking mechanism held in a cache tag, the method comprising:

storing within a tag-RAM, a true-tag that is data of a cache tag attached with an error check bit;

generating a shadow-tag that is data with an inverted polarity of the true-tag; and storing the shadow-tag in a separate address with the tag-RAM.

8. A cache-tag control method according to claim 7, further comprising:

retrieving the true-tag and the shadow-tag one by one at the time of retrieving the tags and checking for an error;

making a hit decision by using the true-tag when the true-tag is not in error; and making a hit decision by using the shadow-tag when the true-tag is in error and the shadow-tag is not in error.

9. A cache-tag control method according to claim 8, further comprising:

restraining an updating of the true-tag or the shadow-tag in an address in which an error has been detected; and comparing, by software, the true-tag with the shadow-tag including an error detecting bit, and specifying an error bit based on the comparison.

10. A cache-tag control method according to claim 8, further comprising:

holding the true-tag;

comparing, by hardware, the true-tag with the shadow-tag when an error has been detected; and specifying a bit having a difference, and recording the bit in a register from which the bit can be read by software, thereby specifying an error bit.

11. A cache-tag control method according to claim 8, further comprising:

updating the tags by using, as updated data, a tag of the true-tag or the shadow-tag in which there is no error.

12. A cache-tag control method in an information processing apparatus having a cache, with an error checking mechanism held in a cache tag, the method comprising:

storing in a certain address of a tag-RAM, a true-tag that is data of a cache tag attached with an error check bit;

generating a shadow-tag that is data with an inverted polarity of the true-tag; and storing the shadow-tag in an address identical to that of the tag-RAM but within a separate tag-RAM.

13. A cache-tag control method according to claim 12, further comprising:

simultaneously retrieving the true-tag and the shadow tag at the time of retrieving the tags, and checking for an error; and making a hit decision by using either the true-tag or the shadow-tag in which there is no error.

14. A cache-tag control method according to claim 13, further comprising:

restraining an updating of the true-tag or the shadow-tag in an address in which an error has been detected; and comparing, by software, the true-tag with the shadow-tag including an error detecting bit, and specifying an error bit based on the comparison.

15. A cache-tag control method according to claim 13, further comprising:

holding the true-tag;

comparing, by hardware, the true-tag with the shadow-tag when an error has been detected; and specifying a bit having a difference, and recording the bit in a register from which the bit can be read by software, thereby specifying an error bit.

16. A cache-tag control method according to claim 13, further comprising:

updating the tags by using, as updated data, a tag of the true-tag or the shadow-tag in which there is no error.

* * * * *